(12) United States Patent
Hayes, Sr. et al.

(10) Patent No.: US 6,206,282 B1
(45) Date of Patent: Mar. 27, 2001

(54) RF EMBEDDED IDENTIFICATION DEVICE

(75) Inventors: Doyle A. Hayes, Sr., Grand Rapids; Amy L. Hard, Coldwater; Gregory J. Flesch, Battle Creek, all of MI (US)

(73) Assignee: Pyper Products Corporation, Battle Creek, MI (US)

(*) Notice: Subject to any disclaimer, the term of this patent is extended or adjusted under 35 U.S.C. 154(b) by 0 days.

(21) Appl. No.: 09/260,268

(22) Filed: Mar. 2, 1999

Related U.S. Application Data

(60) Provisional application No. 60/076,617, filed on Mar. 3, 1998.

(51) Int. Cl.[7] ............................................. G06F 17/00
(52) U.S. Cl. ........................ 235/375; 235/385; 235/492
(58) Field of Search ................................. 235/375, 385, 235/487, 492, 384, 383, 493

(56) References Cited

U.S. PATENT DOCUMENTS

| | | |
|---|---|---|
| 3,977,501 | 8/1976 | Alonso . |
| 4,325,469 | 4/1982 | Gurian . |
| 4,470,784 | 9/1984 | Piotrovsky . |
| 5,105,920 | 4/1992 | Grebenstein . |
| 5,228,546 | 7/1993 | Chang et al. . |
| 5,230,393 | 7/1993 | Mezey . |
| 5,252,161 | 10/1993 | Chang et al. . |
| 5,326,939 | 7/1994 | Schafer . |
| 5,401,915 | 3/1995 | Schafer . |
| 5,565,846 | 10/1996 | Geiszler et al. . |
| 5,689,238 * | 11/1997 | Cannon, Jr. et al. ............... 340/568 |
| 5,837,945 * | 11/1998 | Cornwell et al. ................... 177/136 |
| 5,962,834 * | 10/1999 | Markman ............................ 235/385 |
| 5,963,177 * | 10/1999 | Tuttle et al. ........................ 343/872 |
| 5,986,562 * | 11/1999 | Nikolich ........................... 340/693.5 |
| 6,027,027 * | 2/2000 | Smithgalll ......................... 235/488 |
| 6,032,127 * | 2/2000 | Schkolnick et al. ................. 705/23 |

OTHER PUBLICATIONS

"Emerging Smart Materials Systems: Technologies, Applications and Market Opportunities, " by Harold B. Strock, PhD, http://world. std.com/hbstrock/sta/exec.html, printed on Feb. 14, 1998, pp. 1–3.

"Radio Frequency Technology Arises," by Scott Tate, http://ei.cs.vt.edu/history/Tate. RF. HTML, printed on Feb. 16, 1998, pp. 1–3.

Radio Frequency Identification (RFID Products), http://www. deister. com/deisflex. htm, printed on Feb. 14, 1998, pp. 1–6.

"BA tests new high–tech baggage labels," 1998 Reuters News Service, printed Mar. 3, 1999, pp. 1–2.

* cited by examiner

*Primary Examiner*—Karl D. Frech
*Assistant Examiner*—Uyen-Chau N. Le
(74) *Attorney, Agent, or Firm*—Rader, Fishman, Grauer & McGarry, an office of Rader, Fishman & Grauer PLLC

(57) ABSTRACT

A container having a circuit board for storing and transmitting identifying information unique to the container includes a predetermined alphanumeric code transmitted upon activation of the circuit board by a selected radio frequency. The circuit board is encapsulated in a synthetic resinous support member molded to the circuit board. The encapsulation provides a barrier between the circuit board and the environment external to the container. A circuit board reader selectively energizes the circuit board via radio frequency to transmit the identifying information.

11 Claims, 1 Drawing Sheet

RF EMBEDDED IDENTIFICATION DEVICE

CLAIM OF PRIORITY

We claim priority of U.S. provisional patent application Ser. No. 60/076,617, filed Mar. 3, 1998.

BACKGROUND OF THE INVENTION

1. Field of the Invention

The invention relates to identification devices, and more particularly, to a scannable identification device embedded in a molded support structure.

2. Description of the Related Art

Prior constructions for holding and displaying identifying information have proved inadequate. As examples, identification systems for luggage include tags with owner identification information attached to the handle or some other attachment point on the luggage case and identification systems for waste containers include a tag with address or billing information. These tags publicly display identifying information. For luggage, the tags sometimes include an opaque covering or flap which obscures the transparent window until folded back. For waste containers, the billing information is typically visible as the objective is to make it easily readable by the trash collector.

The primary problem with luggage tags of this type is that they are highly susceptible to being torn away from the luggage. Typically, a beaded chain or leather strap is passed through a hole in the cardholder and is extended through the handle of the suitcase or other luggage article to attach the identification tag to the luggage. Modem airline terminals and other transportation facilities have automated baggage-handling equipment, such as conveyor systems, that transport luggage between various locations. Suitcases and similar bags typically travel along the conveyor on their side and the chain or strap, which attaches the luggage bag to the handle, is so long that the tag hangs down below the luggage. As a result, the tag often catches on rollers or other conveyor components. The snagged luggage tag is often destroyed or lost.

A more serious concern about identification tags is that the identifying information is publicly exposed. For waste containers, exposure provides ready access to the account number or owner of the waste container. For luggage, the identifying information often includes personal information about the traveler. When such luggage cases are checked during travel on public transportation, such as on buses, airplanes, and trains, the traveler has no control over who views this personal information, and thus, a traveler's valid desire for anonymity during traveling has been compromised. Also, burglars could easily note at a glance the address of travelers on outbound flights in order obtain locations of potentially uninhabited residences for a possible burglary. Finally, existing tags are unsightly for the most part and can be annoying with they flap against the hand or wrist of a person carrying the luggage.

Also, manufacturers of luggage and waste containers would greatly appreciate an unalterable, unique identification mark for identifying each bag or container and its owner. If such an unalterable identification mark could be included within the bag or container, manufacturers and trash collectors could store the name and other pertinent information of the owner, such as the date of purchase or billing account number, in a central database so that the information is available when the bag or container is serviced, such as for warranty repairs or collection.

Further, such a unique identification mark that is unalterable would be useful when the baggage or waste container is lost. In such a case, the bag manufacturer or waste collector would be contacted when an otherwise unidentifiable item is found. Currently, to accommodate such a need, the identifying information generally would be either exposed on the exterior of the bag, or if hidden, alterable by the owner or another who may have stolen the article or information.

SUMMARY OF THE INVENTION

The present invention is an identification system including a scannable circuit board embedded within a support member. The scannable circuit board will be unalterable by a user, and will remain as an identifier as long as the luggage is in service. More specifically, the support member will include an insert-molded scannable circuit board. Each circuit board will include a predetermined and unique code name or number that will be assigned to each bag. When the user registers the object in which the circuit board is molded, the user information will be assigned a unique identification code name or number. In operation, the circuit board will be unalterable because it is embedded within the support member, and thus is inaccessible without destroying the support member. The circuit board can then be scanned by a reader to identify the user or owner. Finally, a global positioning system can be similarly insert molded in the support member, whereby the location of the object can be determined.

BRIEF DESCRIPTION OF THE DRAWINGS

The invention will now be described with reference to the drawings in which.

DETAILED DESCRIPTION OF THE PREFERRED EMBODIMENTS

The identification system according to the invention can be used for many types of objects. By way of example and without limitation, two particular fields of use are waste containers and luggage. Waste containers are serviced by trash collectors and preferably have identifying indicia for billing purposes. Luggage, including a suitcase, portfolio, overnight case, cosmetic case, vanity case, attache case, briefcase, trunk, valise, purse, handbag, backpack, or chest, among other uses, preferably includes owner-identification information. For any of the aforementioned uses, the invention is to embed a scannable circuit board 20 within a support structure, whereby the embedded circuit board 20 is unalterable by the user without destroying the support member 10.

Figure 1:
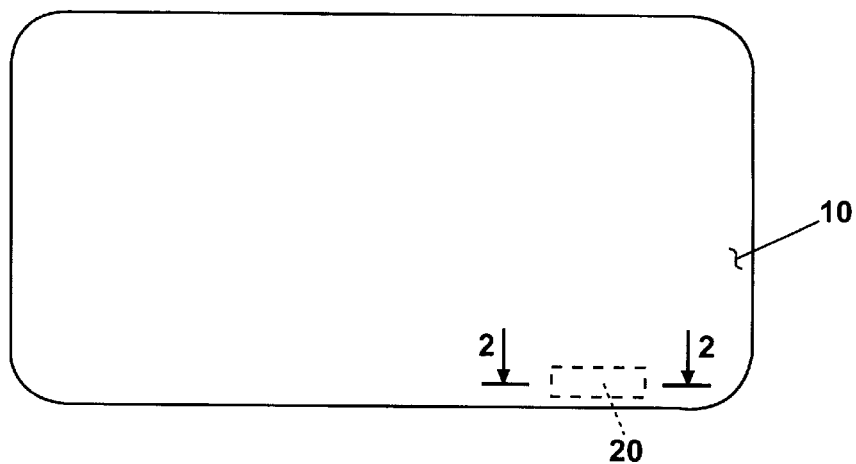
FIG. 1 is a top view of a support member with an embedded circuit board shown in phantom according to the invention.
Figure 2:
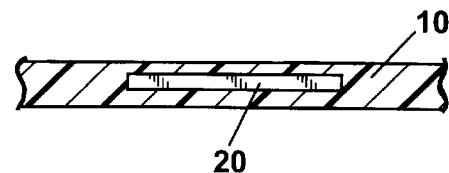
FIG. 2 is a sectional view of the support member of FIG. 1 with the embedded circuit board.

As shown in FIG. 1, a support member 10 includes an embedded circuit board 20. The circuit board 20 is covered on all its surfaces by a synthetic resinous material comprising the support member 10. To embed the circuit board 20, it is preferably insert molded within the support member 10.

For purposes of simplicity in this description, the support member 10 and circuit board 20 are used interchangeably in the description of two sample uses: a luggage 30 and a waste container 50. As the inclusion of the member 10 and board 20 is similar in each use, it is believed the same reference numerals can be used for the different applications without confusion.

Figure 3:
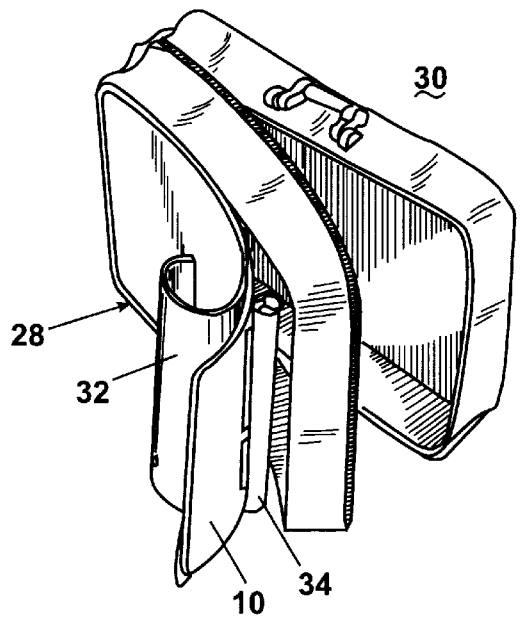
FIG. 3 is a perspective view of a piece of luggage having the support member shown in FIGS. 1 and 2.
Figure 4:
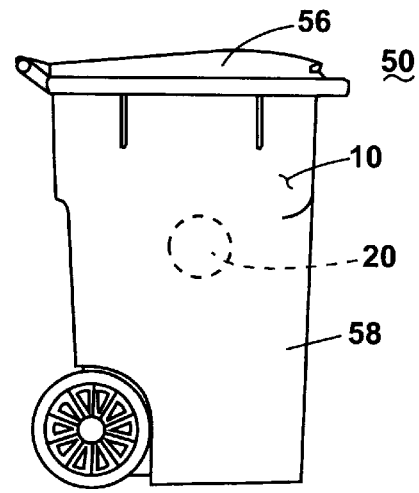
FIG. 4 is a side view of a waste container with an embedded circuit board shown in phantom according to the invention.

As an example, as shown in FIG. 3, the suitcase 30 includes side walls 28 including coverings 32, 34, such as nylon or leather, sandwiching the support member 10. As a further example, as shown in FIG. 4, the waste container 50 includes side walls 58, a bottom wall (not shown), and a top wall or lid 56, wherein at least one of the walls includes functions as the support member 10. The support member 10 is typically made of a deformable plastic material that responds to the particular packing of clothes, waste, or other objects, depending upon the particular application, by bulging outwardly where necessary. Further, support member 10 responds to bumps or stacking of objects by bulging inwardly. In each case, the deformable plastic support member 10 is resilient and returns to its original shape after the force causing the deformation is removed.

As mentioned above, the support member 10 is not limited to suitcases or waste containers, which are only used as an example in order to better understand the invention. The term "luggage" is used to generically describe all similar uses, as detailed above. The term "waste container" is also used to describe all similar uses, including recycling bins and other collection containers.

Most luggage includes some sort of stiffening member, whether located on the top, bottom or sides. Moreover, even in those types of luggage that do not require a stiffening member, it may be desirable to include an insert-molded scannable circuit board 20 so that the circuit board 20 is not alterable. This can be done whether the member 10 is necessary for providing support to the luggage or not. In any case, a manufacturer wants a reliable method of identifying the product for warranty purposes or the user wants a reliable method of identifying the luggage should it become lost or stolen.

Most waste containers are molded and the support member is simply a wall for the container, whether that is a side wall, bottom wall, or lid. Where the container is not molded, a molded support member 10 can be included for encapsulating the circuit board 20 and hinder alteration. Further, such an encapsulating support member 10 can be used regardless of whether support is needed. However the incorporation of the circuit board, the collector of the container needs a reliable method of identifying the owner or account number for billing purposes.

The scannable circuit board 20 is insert molded within the support member 10, which is shaped by cooling (thermoplastic) or by chemical reaction (thermosets). The injection molding process can also be used with plastics, fibers or ceramics. Preferably, injection molding is used wherein a hot, molten polymer is injected into a cold mold supporting the scannable circuit board 20 to be embedded within the polymer. Because the circuit board 20 is sensitive to excessive heat, it is desirable to maintain the temperature of the circuit board 20 as near to room temperature as possible. Thus, a forty-gallon per minute coolant flow rate is recommended for proper cooling.

After the support member 10 cools and solidifies, the mold is opened and the support member 10 is ejected. Conventionally, pins are provided within the mold for maintaining the scannable circuit board 20 in place in the mold during the injection of the molding material. Either the pins remain in place to hold the circuit board 20 until the material is completely cooled, upon which the pins are retracted when the mold is opened, or the pins are retracted when the molding material has only sufficiently cooled to support the scannable circuit board 20 in place, whereupon any blemishes on the outer skin of the mold are covered as the molding material flows to that space vacated by the pins when they are retracted.

It is preferable to form a recessed mold pocket having approximately 0.125 inches of molded material on all sides of the pocket for protecting the scannable circuit board 20 from abuses of the external environment.

The scannable circuit board 20 is preferably a radio frequency identification (RFID) chip, such as that manufactured by Deister Electronics USA, Inc. of Manassas, Va. RFID technology allows an identification tag to be read or written to via transponders contact-free, even through all kinds of non-metallic materials and without line-of-sight. Thus, difficulties in scanning, such as those with typical bar coding, due to humidity, dirt, oil, or grease do not exist. The ability to write to the identification circuit board 20 enables the user to keep and update a portable database without the user of the product in which the identification circuit board 20 is embedded being able to alter the information on the circuit board 20. Further, because the identification chips 20 may be written over by the manufacturer, the ability to reuse them reduces the amount of consumable resources used in identifying and tracking luggage.

For the in-molded identification system as described herein, the scannable circuit boards 20 is preferably a 256-bit one-time programmable code carrier or a factory random-coded 64-bit fixed-code carrier is preferred as a scannable circuit board 20. For these read-only code carriers, it is most preferred to use Texas Instruments' TIRIS series RI-TRP-R9QL disk transponder, which includes 64 bit memory and resistance to high temperatures and shock.

The scannable circuit board 20 does not use batteries, but receives its power from an electromagnetic field generated by a reader. Thus, a long life expectancy is guaranteed. Furthermore, scannable circuit boards 20 are available in various physical sizes, up to 100 millimeter in diameter for a relatively long read range. Furthermore, a variety of reader antennas allow reading distances up to 10 feet. Because these RFID identification circuit boards 20 can be read from such distances, they are ideal for embedding within the insert injection-molded support member 10 for luggage 30 and waste containers 50 as explained above.

The identification circuit boards 20 can also be used to identify luggage 30 at an airport, wherein airport security would have readers capable of reading the identification numbers on the embedded identification circuit board 20 and then contacting the manufacturer for owner identification where security is at risk. Owner look-up databases can be readily available to facilitate quick access to this information. Moreover, lost luggage having these embedded identification circuit boards 20 can be reunited with its owner in cases where an attached luggage tag may be removed or not used at all. By simply contacting the manufacturer of the luggage with the identification code, the manufacturer can notify the owner. Also, use of these identification circuit boards 20 allows the user to feel secure about not losing the luggage without revealing otherwise personal information through tags attached to the exterior of the bag.

For waste containers 50, the ability of the collector to read and store billing information upon collection without physically recording any information eases the billing process. The scannable circuit board 20 enables tracking disposal dates, automated billing per container, and driver efficiency on established routes. Further, where the reader is part of the waste container lifting arm for carrying the container over the collection bin on a waste collection vehicle, the waste container information can be simply read and stored for later billing, all without necessitating human intervention for the recordation of this information.

For any use, because the scannable circuit boards 20 are encapsulated in a molded piece 10, the circuit boards 20 cannot be altered or read without a programmer or reader. Further, where a one-time programmable or read-only scannable circuit boards 20 are used, the circuit boards 20 cannot be altered.

Finally, as global positioning system antennas have become smaller over the past few years, by providing a power supply and antenna, luggage including such a system could be tracked anywhere in the world. There are obvious advantages for security and lost luggage. Another advantage is the ability to locate the owner of the luggage when the owner is still with the luggage.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

We claim:

1. In a container, a circuit board for storing and transmitting identifying information unique to the individual container and including a predetermined alphanumeric code transmitted upon activation of the circuit board by a selected radio frequency, and a synthetic resinous support member molded to encapsulate the circuit board and to provide structural support for the container, the encapsulation providing a barrier between the circuit board and an environment external to the container to thereby embed the circuit board within the support member, wherein the radio frequency is selectively provided by a circuit board reader to energize the circuit board to transmit the identifying information.

2. A container according to claim 1 wherein the support member is integrally formed with the container.

3. In a waste container, an identification system including a scannable circuit board and a circuit board reader, the waste container having a synthetic resinous support member to provide structural support for the waste container, the circuit board being mounted to the support member and encapsulated therein to thereby embed the circuit board within the support member, the circuit board being adapted to store identifying information unique to the individual container and to transmit the unique identifying information through the support member, the reader selectively emitting a radio frequency for energizing the circuit board through the support member, whereby the circuit board transmits the unique identifying information when energized by the reader.

4. An identification system according to claim 3 wherein the support member is a side wall of the waste container.

5. An identification system according to claim 3 wherein the support member is a lid of the waste container.

6. An identification system according to claim 3 wherein the identifying information is a predetermined alphanumeric code.

7. An identification system according to claim 3 wherein the support member is integrally formed with the waste container.

8. In a piece of luggage, an identification system including a scannable circuit board and a circuit board reader, the luggage having a synthetic resinous support member, providing structural support for the luggage, a liner, and a cover, the circuit board being mounted to the support member and encapsulated therein to thereby embed the circuit board within the support member, the circuit board being adapted to store identifying information unique to the individual piece of luggage and to transmit the unique identifying information through the support member and cover, the reader selectively emitting a radio frequency for energizing the circuit board through the support member and cover, whereby the circuit board transmits the identifying information when energized by the reader.

9. An identification system according to claim 8 wherein the support member is an injection-molded support structure sandwiched between the cover and liner of the luggage.

10. An identification system according to claim 8 wherein the identifying information is a predetermined alphanumeric code.

11. An identification system according to claim 8 wherein the support member is integrally formed with the luggage.

* * * * *